United States Patent
Doonan et al.

[15] 3,674,303
[45] July 4, 1972

[54] LIVESTOCK TRAILER

[72] Inventors: Wendell M. Doonan; Ronald E. Knobloch, Great Bend, Kans.

[73] Assignee: Doonan Truck & Equipment, Inc., Great Bend, Kans.

[22] Filed: April 10, 1970

[21] Appl. No.: 27,220

[52] U.S. Cl. ..................................296/24 C, 119/11
[51] Int. Cl. ...............................................B60r 5/00
[58] Field of Search .................................296/24 C

[56] References Cited

UNITED STATES PATENTS

| | | | |
|---|---|---|---|
| 3,145,045 | 8/1964 | Felburn | 296/24 C |
| 2,970,861 | 2/1961 | Short | 296/24 C |
| 3,020,083 | 2/1962 | Doan | 296/24 C |

*Primary Examiner*—Philip Goodman
*Attorney*—Don M. Bradley

[57] ABSTRACT

A drop-center livestock trailer having a plurality of top swinging gates between the rear and upper compartments. Each gate has a pair of plunger locks operated with a common bar and provided with lost motion linkage to insure positive latching of one plunger even if the other plunger is obstructed. A ramp swings downwardly from the rear edge of the upper deck of the trailer for loading from the rear deck into the upper deck. The ramp swings into an upright position behind the gates for positively securing the latter and a chute covered with vertically swinging deck doors permits loading from the rear compartment to the lower compartment. Air operated power means swings a wall of the front compartment to lower a ramp for loading forwardly from the upper compartment and shock absorber means is provided for cushioning the impact of the swinging of gates between compartments.

10 Claims, 24 Drawing Figures

3,674,303

LIVESTOCK TRAILER

This invention relates to vehicles, and more particularly to a wheeled livestock carrier having a plurality of decks for maximum conservation of space. The embodiment of the invention chosen for illustration in the drawings is in the nature of a truck trailer, but the principles of the invention might be equally applicable to other livestock carriers such as railroad cars or the like. Those skilled in the art will also recognize that certain of the principles of the invention may be applied to other types of livestock pens.

Drop-center trailers are in widespread use for transporting livestock such as cattle, sheep, swine and the like. Because of the space required for the wheel assemblies at the front and rear of the trailer, it is conventional to maximize the hauling capacity of such trailers by providing a pair of vertically arranged compartments in the midsection between the wheel assemblies.

Various ramp means have been provided for loading the livestock from the first compartment onto the upper deck of the trailer. Generally, these have been in the nature of separate or removable "bull boards" or ramps which telescope from beneath the upper deck to the loading position. Such boards are usually heavy, unwieldy, and are difficult to use. Further, storage of such devices present space problems in trailers where space is already at a premium.

Another difficulty with conventional trailers resides in the construction of the gates between compartments. These are often flimsy, easily sprung so that they are difficult to close, and may be dangerous if knocked by an animal against a workman during the loading operation.

In some trailers, power means is used for raising and lowering a portion of the upper deck for use as a loading ramp for the forward compartment. The power is provided by hydraulic piston and cylinder assemblies which are often sluggish in operation, especially in cold weather. Moisture frozen on the side walls of the cylinders may stop operation of the assemblies entirely. Further, the assemblies of conventional trailers operate through linkage at the sides of the compartment presenting hazardous structure capable of injuring hapless animals which may happen to catch their feet in the linkage.

Accordingly, it is the primary object of this invention to provide an improved livestock carrier which is constructed for easier and safer operation yet which minimizes structure weight and maximizes carrying space to insure the greatest possible payload capacity for the carrier.

Another object of the invention is to provide novel positive locking structure for the gates between compartments to insure that the gates are automatically secured when in their closed positions even though some of the locking structures may be clogged by ice, dirt or other debris on the carrier floor.

Still another object of the invention is to provide a rear ramp which swings to an upright, stand-by position behind the rear compartment gates to positively insure against inadvertent opening of the gates and to minimize space occupied by the ramp.

Still another very important object of the present invention is to provide novel over-center locking linkage and air operated power means for actuating the front loading ramp to eliminate malfunctioning of the operating means and to eliminate hazards which could lead to injuries to animals transported in the carrier.

Another object of the invention is to provide novel compartment gates constructed for swinging about elevated, horizontal axes so that the gates may be quickly and easily swung with the aid of gravity from overhead stand-by positions to the closed positions.

A yet further object of the invention is to provide means for absorbing the shock of the impact of the swinging gates to eliminate damage to the gates and to minimize the possibility of injury from the gates as they are swung to their closed positions.

Still another object of the invention is to provide a gate comprised of a plurality of interconnected, relatively articulating, lightweight yet extremely rigid panels for easy, convenient and reliable operation.

Another object of the invention is to provide a novel structure for convenient and ready availability of the vehicle spare wheel and tire assembly.

These and other important objects of the invention will be further explained or will become apparent from the description, claims and drawings.

Figure 1:
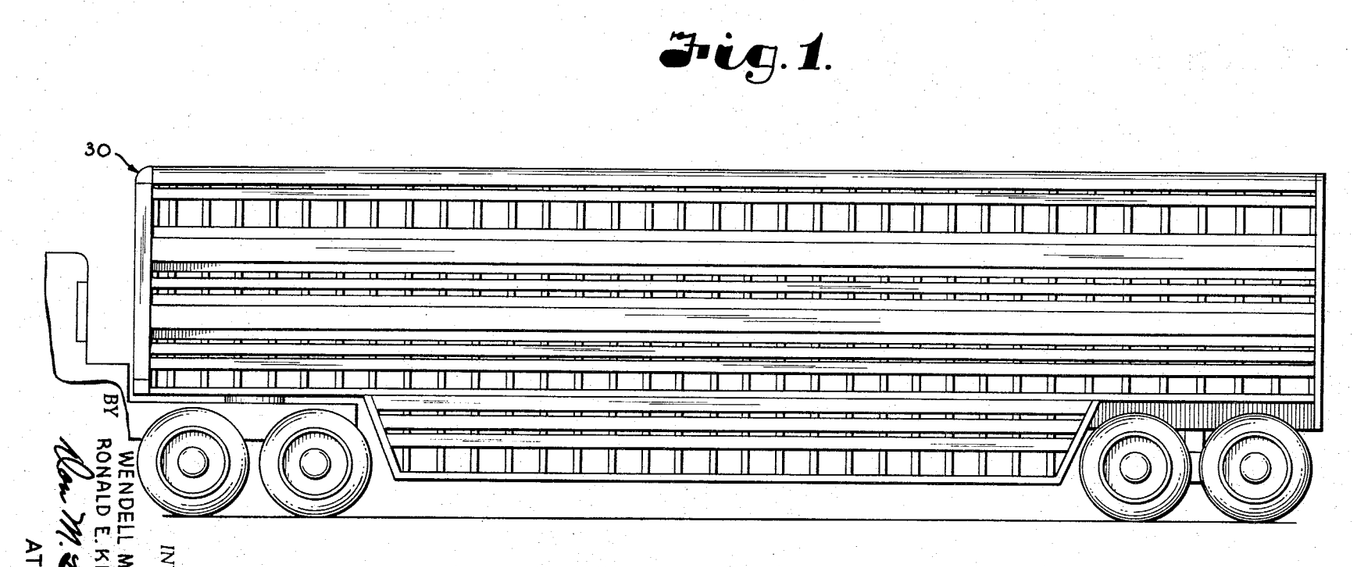
FIG. 1 is a fragmentary, side elevational view of a truck of the type embodying the principles of this invention.
Figure 2:
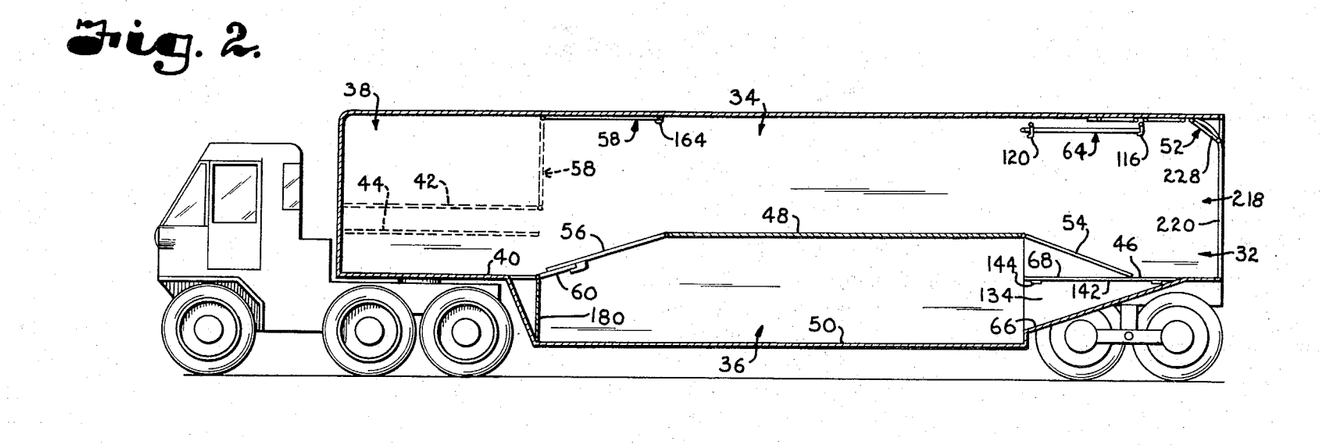
FIG. 2 is a vertical, cross-sectional, partially diagrammatic view, on a reduced scale, through the trailer illustrating the decks and gates.
Figure 3:
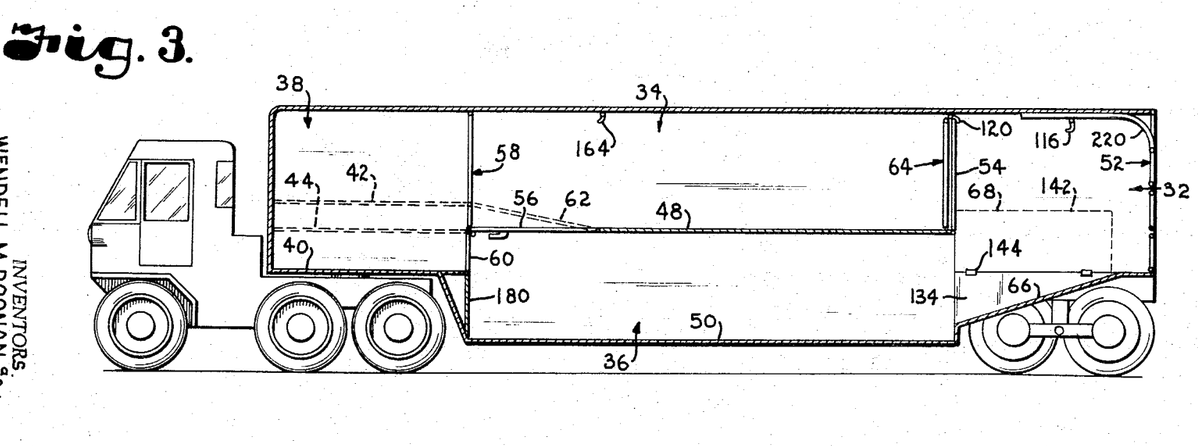
FIG. 3 is a view similar to FIG. 2, but showing alternate positions for the gates and ramps.

A livestock carrier embodying the principles of this invention is broadly designated by the reference numeral 30. Referring particularly to FIGS. 2 and 3, the carrier has a rear compartment 32 immediately behind a pair of vertically arranged upper and lower central compartments 34 and 36. A forwardmost compartment 38 immediately in front of compartments 34 and 36 has a bottom deck 40 and may be provided with intermediate decks 42 or 44 in the positions illustrated in broken lines in these figures of the drawing.

The deck 46 of rear compartment 32 is intermediate the heights of decks 48 and 50 of compartments 34 and 36 respectively. The various compartments of carrier 30 may be loaded in any of a number of different ways. Access to the interior of the carrier is provided through a doorway 52 in the extreme rear wall of the carrier. Animals enter compartment 32 through this door whereupon they may be moved to compartment 34 by means of a ramp 54 extending at an angle between decks 46 and 48 as illustrated diagrammatically in FIG. 2.

The animals may be moved through compartment 34 and into compartment 38 for loading the forwardmost compartment of the carrier. In many hauling operations, especially those involving the transportation of relatively large animals such as cattle, horses or the like, the deck 44 will be positioned where illustrated and deck 42 will be omitted from the carrier. In such event, a swingable ramp 56 comprising a forwardmost section of deck 48 is maintained in the position shown in FIG. 3 in alignment with deck 44. The animals are moved into compartment 38 past a system 58 of overhead swinging gates to be described in detail hereinafter. Once the animals are in compartment 38, the gate system 58 is moved from the full line position shown in FIG. 2 to the dotted line position of FIG. 2 and the full line position of FIG. 3. Manifestly, the gate system 58 holds the animals in the front compartment 38 so that the remaining compartments of the carrier may be loaded.

When the carrier is used for hauling relatively short animals such as hogs, sheep or even relatively small calves, deck 44 may be omitted and deck 42 is installed in the position designated in FIGS. 2 and 3 of the drawings. In such event, ramp 56 cooperates with a swingable wall 60 of front compartment 38 to assume the position illustrated in FIG. 2 by the operation of mechanism to be described hereinafter. The animals may be moved down ramp 56 from compartment 34 for loading the portion of compartment 38 below deck 42. Once loaded, wall 60 and ramp 56 are swung to the position shown in FIG. 3. A vertically swingable ramp 62 comprising an integral part of gate system 58 may be swung to the dotted line position illustrated in FIG. 3 for loading the upper portion of compartment 38. In this position, the animals which are first loaded from the rear compartment 32 up ramp 54 onto deck 48 are then moved to ramp 62 into the upper front compartment.

After the entire front compartment 38 is loaded and ramp 62 swung back into the plane of gate system 58, the animals may be loaded into the uppermost main compartment 34. Following this operation, the rear of compartment 34 is closed by an overhead gate system 64 which is moved from the stand-by position shown in FIG. 2 to the closed position shown in FIG. 3. Ramp 54 is swung upwardly about its axis to a stand-by position illustrated in FIG. 3. Bottom compartment 36 may then be loaded by an inclined chute 66. Access to chute 66 is obtained through door means 68 in deck 46 of rear compartment 32.

Rear compartment 32 is loaded last after the door means 68 is returned to its closed position. Manifestly, either compartment 34 or 36 could be loaded prior to the other depending upon the requirements and desires of the operator. A suitable rear gate or closure (FIGS. 21 and 22) for door 52 is used for securing compartment 32 and the carrier is loaded for transport. Those skilled in the art will understand from the foregoing description and explanation of the arrangement of parts that the unloading operation is essentially the reverse of the loading operation and need not be described in detail.

Referring now more particularly to FIGS. 7–12, the gate system 64 for the rear of compartment 34 is illustrated in greater detail. System 64 includes a central gate 70 and a pair of flanking, somewhat narrower gates 72 and 74. Each gate is of rigid rectangular construction and includes a peripheral rectangular frame 76 and a plurality of spaced apart horizontally extending cross members 78. It will be understood that cross members 78 extend upwardly of the gates 70–74 as may be required. Normally, the cross members will extend the full vertical distance of the gates.

Each of the gates 70–74 is mounted for swinging through a vertical arc about a common horizontal axis in the form of an elongated, transversely circular bar 80 extending between the opposite sides 82 and 84 of carrier 30.

Figures 7, 8, 9, 10, 11, 12:
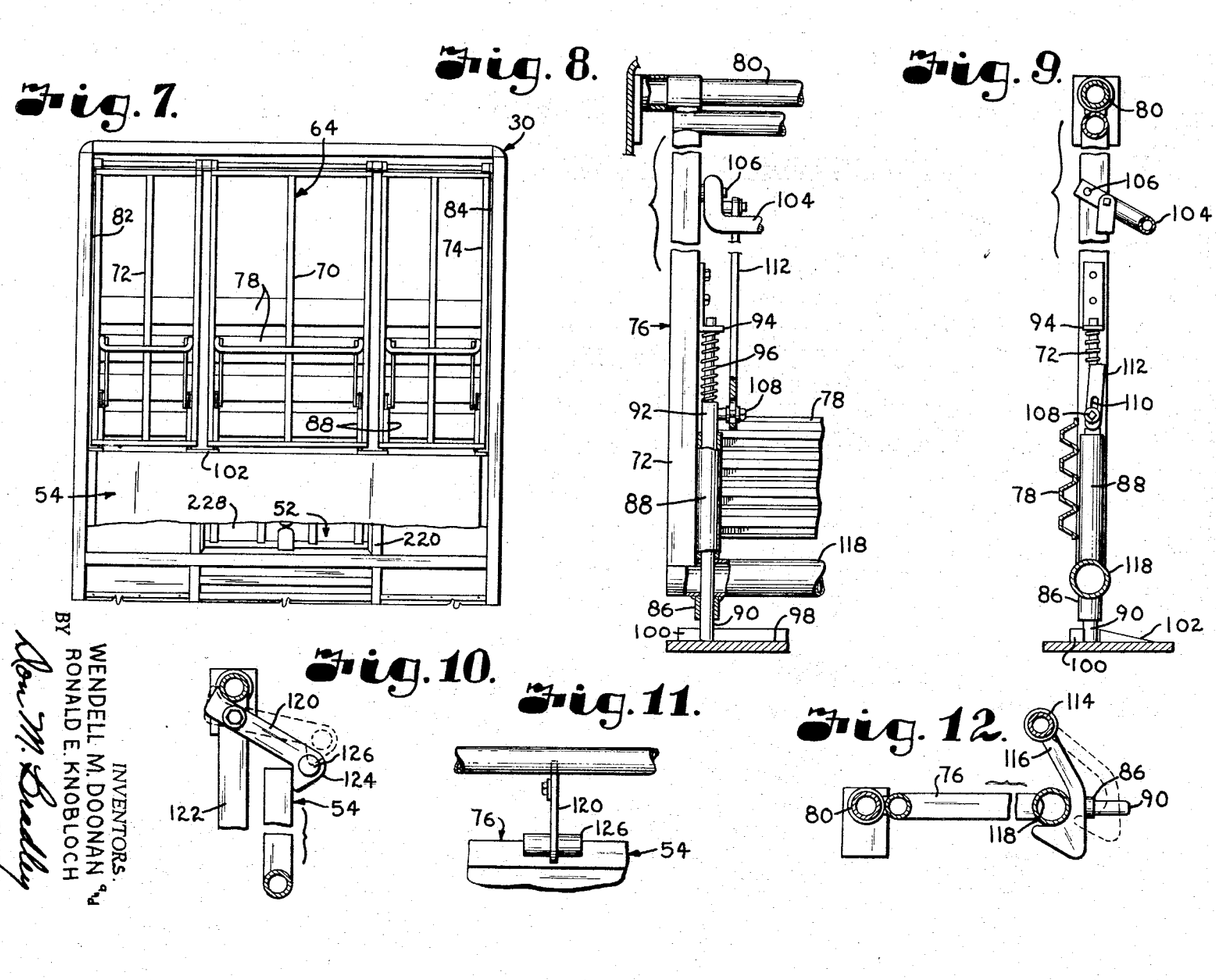
FIG. 7 is a view similar to FIG. 6 but showing the rear ramp in its loading position.
FIG. 8 is a fragmentary, rear elevational view of an upper compartment door, parts being broken away to reveal details of construction.
FIG. 9 is a fragmentary, side elevational view of the door of FIG. 8, parts being broken away to reveal details of construction.
FIG. 10 is an enlarged, fragmentary side elevational view of a latch for the rear ramp.
FIG. 11 is a fragmentary rear elevational view of the latch of FIG. 10.
FIG. 12 is a fragmentary, side elevational view of a latch for holding one of the upper compartment doors in its open position.

Each gate 70–74 has a lock 86 mounted thereon and each lock 86 includes a pair of elongated, rigid, tubular members 88 secured in parallelism to the inner facing surfaces of the pair of upright members of frame 76 as illustrated more particularly in FIGS. 8 and 9. An elongated plunger 90 is telescoped within each of the members 88 for vertical reciprocation therein. The uppermost section 92 of each plunger 90 is of reduced cross sectional diameter and is received through an aperture in the projecting leg of an L-shaped bracket 94 carried by frame 76 above members 88. A helical spring 96 received over section 92 biases the plunger 90 downwardly to the position shown in FIGS. 8 and 9 with a portion of the plunger 90 projecting outwardly beyond the outermost end of tubular member 88.

Socket means for receiving the projecting ends of the respective plungers 90 is in the nature of a channel 98 formed between a pair of elongated members 100 and 102 rigidly secured to the surface of deck 48. Member 100 extends transversely across compartment 34 forward of the leading face of member 102. The latter extends in spaced parallelism rearward of the trailing face of member 100 to present the channel therebetween. The latter is disposed immediately below the respective gates 70–74 when the same are in their closed positions. The upper surface of member 102 is bevelled to taper towards the rear so that the tapered surface forms a cam engageable by the projecting ends of plungers 90 to cause the same to be retracted into members 88 against the bias of springs 96 when the gates are swung toward their closed positions. Manifestly, as soon as the gates swing over channel 98, the spring force urges the plungers into the channel for locking the gates in their vertical positions.

The lock means for each gate 70–74 is entirely independent of the lock means of an adjacent gate so that the gates are operable separately and independently.

An elongated U-shaped operating lever 104 is provided for each gate respectively and each lever 104 is pivoted at the ends of its parallel legs by pin means 106 to the corresponding member of frame 76. A projecting pin 108 carried by each plunger 90 and extending laterally therefrom is received in an elongated slot 110 of an elongated rigid bar 112 which is pivotally secured to lever 104 intermediate the ends of the parallel legs of the latter as shown clearly in FIGS. 8 and 9.

It will be apparent that the operator may grasp the bight portion of lever 104 and unlatch the gate by lifting the lever. Such action draws upwardly on bar 112 to pull the plungers from their corresponding sockets and to permit the swinging of the gates about their axes. Operation of a single lever 104 pulls both plungers simultaneously by the lost motion in the connection between the plungers and the links 112 presented by slots 110 permit either plunger to enter its socket or channel 98 whether or not the corresponding plunger of each pair thereof moves to its advanced position. This insures positive latching for the gates irrespective of any ice, mud or debris in the slot which could prevent one plunger of each pair from advancing as required.

An elongated tubular member 114 (FIG. 12) extends transversely across compartment 32 at the uppermost region thereof behind the hinge 80 for gates 70–76. A swingable hook member 116 for each gate respectively is mounted on member 114 in position to receive the lowermost transverse member 118 of each gate for holding the gate in the horizontal, open position thereof as illustrated in FIG. 12. When it is desired to close a gate, the latch member 116 for that gate need merely be tipped to the rear to permit the gate to be swung to its closed position.

Referring now particularly to FIGS. 10 and 11, a hook 120 is mounted on the central upright member 122 of gate 70 for pivoting between the positions illustrated in solid and broken lines respectively. The nose portion 124 of hook 120 is adapted to receive the uppermost edge of ramp 54 for releasably holding the latter in its upright, stand-by position. Hook 120 is provided with an elongated transversely circular weight 126 projecting outwardly laterally from each side of the hook and adapted for holding the hook in its latched position. It will be evident that the weight 126 may be easily grasped for swinging the hook to release ramp 54 as will be hereinafter explained.

Figure 6:
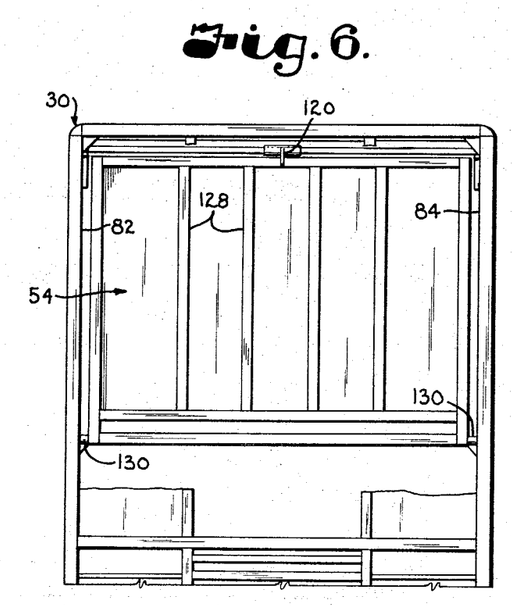
FIG. 6 is a fragmentary, rear elevational view of the trailer, parts being broken away to reveal details of construction.

The ramp 54 is illustrated in the up, stand-by position in FIG. 6 and in the down, inclined position in FIG. 7. The ramp is of rectangular configuration and comprises a plurality of frame members 128 mounted for swinging movement through a vertical arc about a pair of aligned hinges 130 (FIG. 6). Although not illustrated in FIG. 7, it is contemplated that the upper surface of ramp 54 may be provided with a plurality of spaced apart transversely extending cleats to prevent slipping as the animals walk up or down the ramp. Further, it is contemplated that the ramp may be constructed entirely or partially of light weight materials such as aluminum or the like to facilitate manual movement of the ramp between the stand-by and inclined positions.

The rear wall 132 (FIGS. 2, 4 and 5) of compartment 36 extends upwardly above the level of deck 46 and has an opening 134 to permit entry of the animals into compartment 136 as they move down the inclined chute 66. The side walls 138 of chute 66 are provided with upwardly and outwardly inclined corner plates 140 as shown in FIG. 4 to eliminate sharp corners which might injure the animals.

Door means 68 comprise a pair of abutting rectangular doors 142 hinged to the upper edges of walls 138 respectively by hinges 144. The doors 142 have transversely extending seals 146 and the outermost ends of the seals are shaped complementally with the tapered portions 148 adjacent the uppermost margins of walls 138 for supporting the doors 142 in their horizontal positions. Further, the innermost ends of the aligned seals 146 abut to impart additional support for doors 142 so that the latter may sustain the weight of the animals on deck 46.

Figure 4:
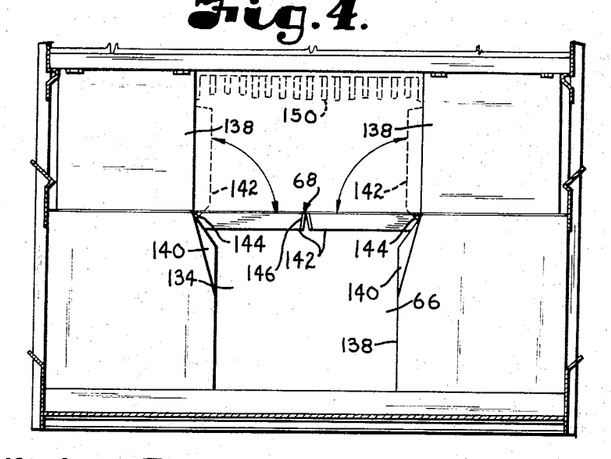
FIG. 4 is a fragmentary, vertical, cross-sectional view through the trailer looking toward the cattle chute and rear compartment.
Figure 5:
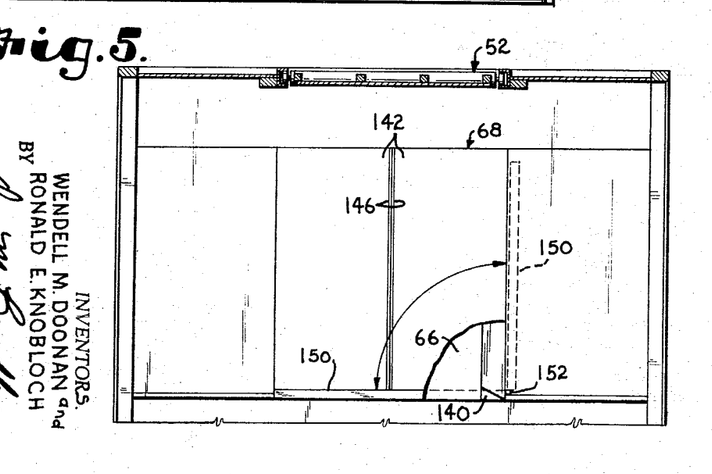
FIG. 5 is a fragmentary, horizontal, cross-sectional view through the trailer showing the deck of the rear compartment in plan.

The portion of opening 134 above deck 46 is closed by a rectangular gate 150 shown fragmentarily in broken lines in FIG. 4 and illustrated in plan in FIG. 5. Gate 150 is hinged about a vertical axis by hinges 152 and may swing to the open position illustrated in broken lines in FIG. 5. Manifestly, gate 150 is moved to its open position before doors 142 are opened to permit livestock to move down chute 66 into compartment 36. Any suitable latch means is provided for holding gate 150 in its closed position.

Figure 13:
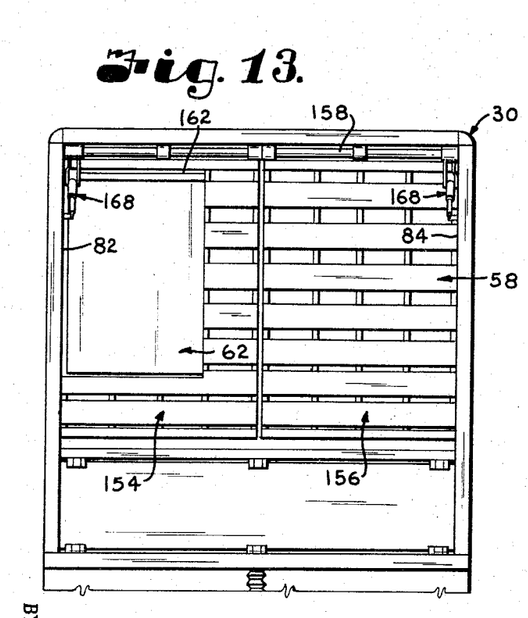
FIG. 13 is a fragmentary, vertical cross-sectional view through the trailer showing the upper compartment front gates in elevation.
Figure 14:
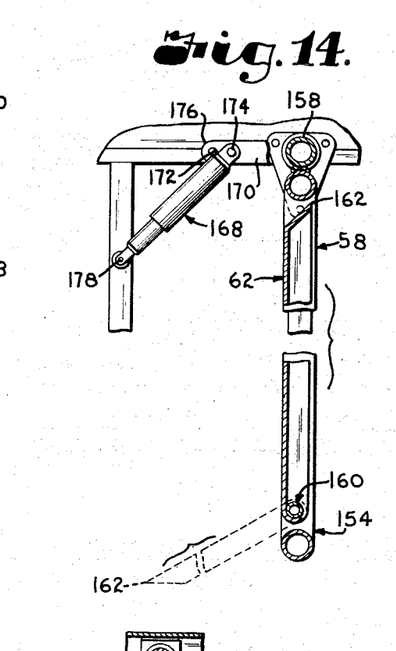
FIG. 14 is an enlarged, fragmentary, vertical cross-sectional view through a front gate illustrating the shock absorbing mechanism in elevation, an alternate position of the gate ramp appearing in broken lines.
Figure 15:
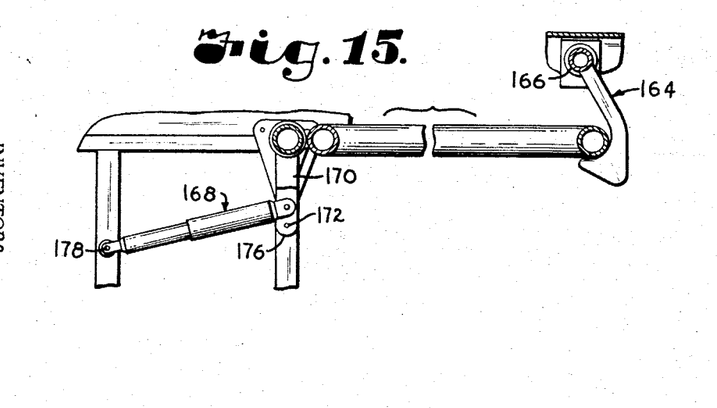
FIG. 15 is a view similar to FIG. 14 but showing the gate latched in its open position.

The front gate system 58 for compartment 34 comprises a pair of rectangular rigid gates 154 and 156 swingable about a rigid, transversely circular rod 158 extending between the sides 82 and 84 of carrier 30 as shown in FIG. 13. The gate 154 mounts ramp 62 for swinging about a horizontal axis adjacent the lowermost edge of ramp 62 and defined by hinge means 160. The uppermost edge 162 of ramp 62 is bevelled for smoothly joining the upper surface of deck section 56 when the ramp is in its down position as illustrated in FIG. 3. Normally, however, ramp 62 is in the full line position illustrated in FIGS. 13 and 14 and in the plane of door 154 for movement with the latter. Manifestly, suitable latching means is provided for releasably holding the ramp in its stand-by position. Each gate 154 and 156 swings independently of the other to and from the open, stand-by position illustrated in FIG. 15. A swingable hook 164 mounted on a transverse rod 166 for each gate serves to releasably hold each gate in the open position.

Figure 16:
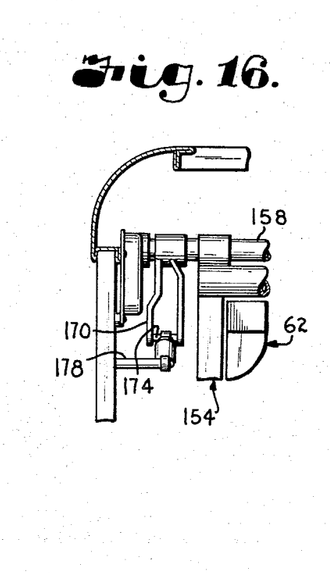
FIG. 16 is an enlarged, fragmentary, vertical cross-sectional view through the trailer and illustrating the mechanism of FIGS. 14 and 15 in front elevation.
Figure 17:
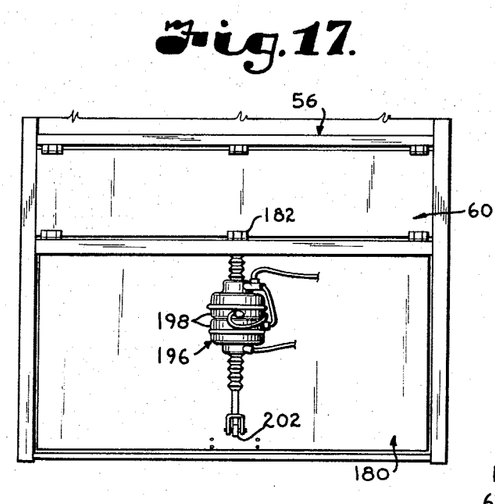
FIG. 17 is a fragmentary, vertical cross-sectional view through the trailer illustrating the front ramp operating mechanism in front elevation.
Figure 18:
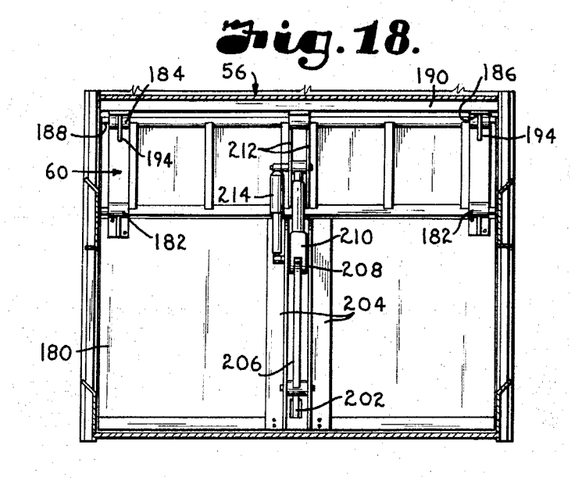
FIG. 18 is a view similar to FIG. 17 but showing the front ramp operating mechanism from the rear side of the compartment wall.

Means for absorbing the impact from closing the front gates 154 and 156 include a shock absorber assembly 168 for each gate respectively. Assembly 168 includes bifurcated arm structure 170 rigidly secured to the corresponding gate and extending radially outwardly from the axis of swinging thereof. A plurality of holes 172 (FIG. 14) extending through the legs of structure 170 are adapted to receive cross pin 174 for pivotally coupling one end of a shock absorber 176 to the gate. The other end of absorber 176 is secured to the adjacent carrier wall structure by means of a laterally extending pin 178 carried by the wall and projecting inwardly therefrom as illustrated in FIG. 16. The positions of pin 178 and arm structure 170 are such that they cooperate with shock absorber 176 for compressing the latter during the swinging of the corresponding gate 154 or 156 from the open to the closed positions. This insures that the impact from the closing of the relatively heavy gates is at least partially absorbed by the shock absorber to minimize the possibility for injury from the gates or damage to the latter during operation. The series of spaced apart holes 172 permit adjustment as may be required and as will be apparent to those skilled in this art.

The gates 154 and 156 are provided with releasable latching structure (not shown) and the uppermost surface of ramp 162 may have cleats secured thereon to provide an anti-slip surface for the animals.

The construction of the movable section 56 of deck 48 and the cooperating wall 60 is shown more in detail in FIGS. 17–20 of the drawings. Wall 60 comprises a rectangular reinforced unit hinged to a permanent upright lowermost front wall section 180 (FIG. 2) of compartment 36 by hinge means 182. Thus, wall 60 swings about its lowermost edge along a horizontal axis proximal the uppermost edge of wall 180 to and from the upright position illustrated in FIG. 19 to the inclined position illustrated in FIG. 20. A plurality of spaced apart rollers 184 carried at the uppermost edge of wall 60 support the weight of deck section 56. To this end, the lowermost surface of section 56 is provided with elongated planar strips 186 (FIG. 18) of steel or the like along the path of movement of the respective rollers 184 to provide a smooth rolling surface to be engaged by each roller during movement of the wall 60 and section 56 to and from the positions shown in FIGS. 19 and 20.

The end of section 56 remote from wall 60 is hinged by hinges 188 to the sides of carrier 30 and to the rigid deck 48. It is to be noted that section 56 includes a plurality of spaced apart sills 190 secured to fore and aft extending side members 192 so that the weight of section 56 is transferred to members 192. This permits hinging at the extreme sides of section 56 by hinges mounted in the ends of members 192 and obviates the necessity for a "piano" type hinge along the transverse width of the swingable section.

Figure 20:
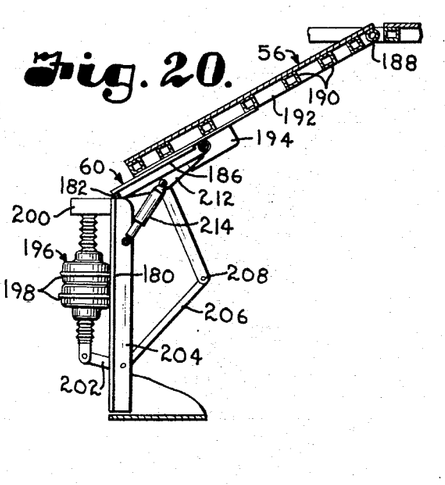
FIG. 20 is a view similar to FIG. 19 but illustrating the positions for the components of the mechanism when the ramp is in its down, loading position.

Each of the members 192 have depending hooks 194 secured thereto and facing in the direction of wall 60 for receiving and supporting the uppermost edge of the latter when the wall moves to the position shown in FIG. 20. The hooks 194 serve to lock the angled members together for supporting the weight of animals walking on the inclined deck section 56 which serves as a ramp between compartments 34 and 38. It is contemplated that cleats (not shown) may be provided for the upper surface of section 56 to present the anti-slip condition as may be desired.

Figure 19:
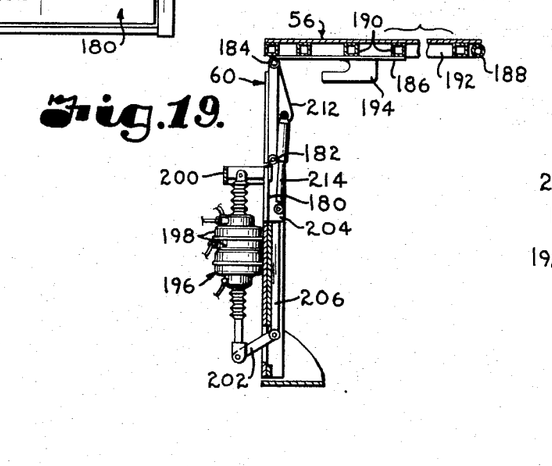
FIG. 19 is a fragmentary, vertical, cross-sectional view through the trailer illustrating the front ramp operating mechanism when the ramp is in its up, locked position.

Mechanism for moving wall structure 60 to and from the upright position thereof is broadly designated by the reference numeral 196 and includes a pair of air operated diaphragm and piston assemblies 198 arranged in back to back battery as illustrated in FIG. 19. The piston of the upper assembly 198 is pivoted to a bracket 200 rigidly mounted to wall 180 and projecting forwardly therefrom immediately below the axis of hinging of wall 60. The piston of the lowermost assembly 198 is pivotally coupled to an arm 202 projecting forwardly of wall 180 and pivoted to a pair of parallel spaced apart upright angle members 204 mounted on the rear surface of wall 180.

Arm 202 is rigidly secured to a second arm 206 to form a bell crank which is pivoted at 208 in the channel members 204.

The upper end of arm 106 is pivoted to an elongated rigid adjustable turnbuckle 210. The latter is pivotally coupled to a pair of spaced apart depending brackets 212 carried by the rear surface of wall 60. A shock absorber 214 has one end thereof pivotally coupled to the proximal bracket 212 and the other end is pivotally coupled to one of the channel members 204 as shown best in FIG. 20.

It will be apparent to those skilled in the art that the assemblies 198 are fastened together and that the extensible rods thereof are advanced each time air is introduced to the assemblies in one direction and the rods are retracted when air is introduced into the assemblies in the other direction or on the other sides of the respective diaphragms. It will also be apparent that mechanism 196 results in the swinging of the linkage to the positions shown in FIG. 19 when the rods are in their extended positions. This moves rollers 184 toward the outermost end of section 56 to swing the latter to the position generally in extension of deck 48. On the other hand, when mechanism 196 is operated in the direction for retracting the rods thereof, arm 206 is swung about pivot 208 to fall wall 60 back on its hinges to the position shown in FIG. 20. This permits animals to be loaded up or down the ramp presented by the overlapping deck section 56 and wall 60.

When the components are in the position illustrated in FIG. 19, arm 206 and turnbuckle 210 move to a slightly over center position which securely locks section 56 in its upper position. The mechanical advantage presented by the relatively short arm 202 breaks this over center position to permit downward swinging of the wall and deck section upon actuation of mechanism 196. The shock absorber 214 minimizes the impact of the swinging of the wall 60 carrying the weight of deck 56.

The two assemblies 198 arranged in battery permit use of the diaphragm type air operated assemblies by effectively doubling the length of the stroke of a diaphragm operated rod. It is considered especially important that the diaphragm type assemblies be utilized to obviate the hazard of malfunction as has been known to occur when piston and cylinder assemblies are utilized. It is believed that the condensation of moisture causes such piston and cylinder assemblies to malfunction and mechanism 196 is disposed in a location where it is subject to the effects of moisture in normal use of the carrier.

The construction heretofore described presents a convenient, relatively safe livestock carrier capable of achieving the objects set forth above. Not to be overlooked is the central location for mechanism 196 which completely eliminates linkage heretofore conventional at the outermost edges of the mid section swingable ramp and which has been a particular hazard for injury to animals in the compartments. The convenient location for the back ramp 54 not only insures that it is immediately available for use when desired, but also insures against inadvertent opening of the gates to permit the animals to fall from compartment 34 into compartment 32 while in transit. Chute 66 utilizes space between the rear wheel assemblies 216 so that the animals may be moved into compartment 36 without danger of the animals injuring their backs on the rear edge of the upper compartment deck 48.

Figures 21, 22, 23, 24:
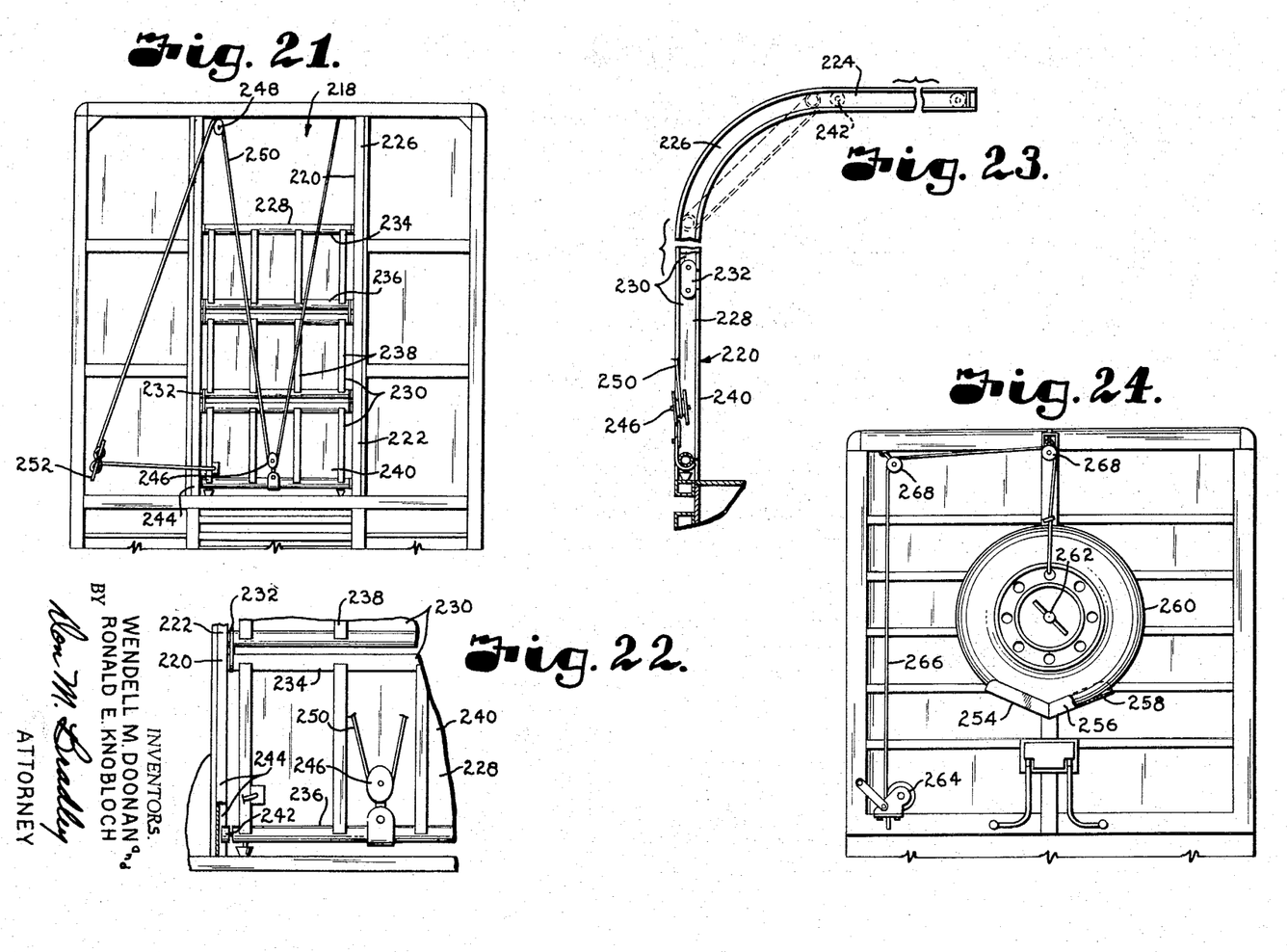
FIG. 21 is a fragmentary, rear elevational view of the trailer illustrating a rear gate constructed pursuant to the principles of this invention.
FIG. 22 is a fragmentary, enlarged rear elevational view of the gate, parts being broken away and shown in cross-section to reveal details of construction.
FIG. 23 is a fragmentary, vertical cross-sectional, view through the gate, portions being omitted to reveal details of construction and operation.
FIG. 24 is a fragmentary, front elevational view of the trailer showing the novel spare tire carrier assembly.

A closure for the rear department is shown in FIGS. 21–23. The rear opening 218 is defined on either side by a track 220 comprising an elongated, generally L-shaped member having a vertically extending straight leg section 222, a horizontally extending straight leg section 224 and a curved section 226 interconnecting the straight leg sections.

The gate must be extremely rigid yet be light enough in weight that it may be quickly and easily moved between an overhead position and a closed, vertical position. To this end, the gate 228 comprises a plurality of rigid panels 230 interconnected by links 232. Each panel 230 comprises a pair of spaced apart elongated, rigid, tubular members 234 and 236. A plurality of elongated, rigid, tubular spacers 238 extend between the members 234 and 236 and are rigidly secured thereto. The leading surface of the panel frame comprising the interconnected members and spacers has a covering such as by a sheet material 240. Preferably, the material 240 is sheet aluminum or the like.

A roller 242 for each end of each member 234 and 236 is secured to the respective members and disposed between the pairs of inwardly projecting flanges 244 for each track 220. The rollers serve to support the panels 230 in the track and guide the panels as the gate is moved between the vertical and overhead positions.

Links 232 are elongated and rigid and the links are pivoted to adjacent pairs of members 234 and 236 as illustrated in FIGS. 21 and 22. The links permit articulation of the respective gate panels during movement of the gate along the curvilinear path of travel. The dotted line position for a panel 230 traversing the curved path provided by track 220 is illustrated in dash lines in FIG. 23.

A pulley 246 is secured to the lowermost member 236 of the lower panel 230 and a second pulley 248 is secured to the structure at the top of the gate opening 218. An elongated, flexible element 250 such as a rope or the like has one end secured to the support structure adjacent pulley 248. Thus, a pull on the element 250 may draw the gate upwardly to the overhead, open position.

The other end of element 250 may be secured to the lowermost panel 230 as illustrated in FIG. 21. If the slack is maintained out of element 250 as by winding on a cleat 252 or the like, gate 228 can be moved a substantial distance from the closed position. On the other hand, release of the element 250 from the cleat permits opening of the gate or closing of the gate depending upon the direction in which element 250 is drawn.

Referring now to FIG. 24, an assembly for releasably carrying the spare wheel and tire for the trailer comprises an upwardly facing V-shaped bracket 254 secured at the front of the trailer. Upwardly extending flanges or lips 256 are integral with the platform portion 258 of bracket 254 so that the latter serves to retain the spare wheel and tire assembly 260 in the position illustrated. An auxiliary, manually releasable device 262 is alignable with the axis of the assembly 260 and provides a clamp to insure against inadvertent displacement of the assembly. A manually operable winch 264 is carried by the trailer in convenient disposition for operation from the ground. A cable 266 is trained over pulleys 268 and is looped around the tire of assembly 260. This winch and cable permits manual installation or removal of the assembly 260 from its mounting bracket even though the weight of the assembly is substantially greater than could ordinarily be conveniently lifted by one man.

Having thus described the invention, what is claimed as new and desired to be secured by Letters Patent is:

1. In a wheeled livestock carrier having a rear compartment and upper and lower vertically arranged compartments forwardly of the rear compartment, the deck height of the rear compartment being intermediate those of said upper and lower compartments, means for closing said upper compartments comprising:

gate means;
   means mounting said gate means to the carrier for swinging to and from a position closing the rear end of said upper compartment;
   ramp structure;
   means pivotally coupling said structure to the carrier for swinging about a horizontal axis from a loading position extending at an angle between the decks of said upper compartment and the rear compartment respectively, to a closed position with the structure extending upwardly from said upper deck, the structure in said closed position being disposed to reinforce said gate means; and
   lock means releasably securing said structure in the closed position.

2. The invention of claim 1, wherein the axis of swinging movement of said structure is proximal the rearmost edge of the deck of said upper compartment.

3. The invention of claim 2, wherein said gate means is mounted for swinging about a horizontal axis substantially at the top of said gate means, and wherein the gate means and the ramp structure extend in substantial parallelism when each is in its respective closed position.

4. In a wheeled livestock carrier having a rear compartment and upper and lower vertically arranged compartments forwardly of the rear compartment, the deck height of the rear compartment being intermediate those of said upper and lower compartments, means for closing said upper compartments comprising:
  gate means;
  means mounting said gate means to the carrier for swinging to and from a position closing the rear end of said upper compartment;
  ramp structure;
  means pivotally coupling said structure to the carrier for swinging about a horizontal axis from a loading position extending at an angle between the decks of said upper compartment and the rear compartment respectively, to a closed position with the structure extending upwardly from said upper deck; and
  lock means releasably securing said structure in the closed position, said carrier including a chute disposed beneath the deck of the rear compartment and extending downwardly at an angle from the deck of the rear compartment toward the deck of the lower compartment, and wherein said deck of the rear compartment includes door means openable to provide access to the chute for loading livestock from the rear compartment into the lower compartment.

5. The invention of claim 4, said carrier including a pair of spaced apart ground engaging wheels, and wherein the bottom of said chute extends between said wheels below the upper level thereof.

6. The invention of claim 3, wherein said gate means includes a plurality of gates swingable on a common axis, and releasable lock means for each of said gates for securing the respective gates in their closed positions.

7. The invention of claim 6, wherein is included a releasable latch for each of said gates, said latches being carried by the carrier in dispositions for releasably securing the respective gates in their open positions.

8. In a wheeled livestock carrier having upper and lower vertically arranged compartments and a third compartment adjacent said vertically arranged compartments, the deck of said third compartment being lower than the deck of said upper compartment, means for presenting a livestock ramp between the decks of a said upper and third compartments comprising:
  a movable deck section at the end of said upper deck proximal said third compartment;
  means pivotally mounting said section for swinging movement from a first position extending substantially in the plane of the upper deck to a loading position extending at an angle downwardly toward the third compartment deck; a wall for the third compartment, said wall normally extending upwardly from the deck of the third compartment proximal the upper compartment and terminating adjacent the end of said section in position supporting the latter when the section is in said first position;
  means mounting said wall for swinging movement about its lower edge from said first position to an angled position underlying said section to permit the section to move to said loading position under the influence of gravity; and
  air operated power means operably coupled with the wall for swinging the latter to and from said positions.

9. The invention of claim 8, wherein is included hook means carried by said section and adapted to receive the upper edge of said wall for releasably holding the latter in said angled position when the section is in said loading position.

10. The invention of claim 9, wherein is included roller means carried by the wall adjacent the upper edge thereof, said roller means being disposed to engage the lower surface of said section to facilitate movement of the wall to and from said angled position while supporting said section.

* * * * *